(12) United States Patent
Hisada et al.

(10) Patent No.: US 11,084,126 B2
(45) Date of Patent: Aug. 10, 2021

(54) LASER WELD METHOD AND WELD STRUCTURE

(71) Applicant: TOYOTA JIDOSHA KABUSHIKI KAISHA, Toyota (JP)

(72) Inventors: Kohei Hisada, Nagoya (JP); Atsushi Kawakita, Miyoshi (JP); Masahiro Nakata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 334 days.

(21) Appl. No.: 16/164,075

(22) Filed: Oct. 18, 2018

(65) Prior Publication Data

US 2019/0070695 A1 Mar. 7, 2019

Related U.S. Application Data

(62) Division of application No. 14/680,455, filed on Apr. 7, 2015, now Pat. No. 10,137,530.

(30) Foreign Application Priority Data

Apr. 8, 2014 (JP) .................................. 2014-079702

(51) Int. Cl.
*B23K 26/352* (2014.01)
*B23K 26/22* (2006.01)
(Continued)

(52) U.S. Cl.
CPC .......... *B23K 26/352* (2015.10); *B23K 26/082* (2015.10); *B23K 26/22* (2013.01);
(Continued)

(58) Field of Classification Search
CPC .... B23K 26/352; B23K 26/22; B23K 26/082; B23K 26/244; B23K 26/32
(Continued)

(56) References Cited

U.S. PATENT DOCUMENTS

| 4,572,941 A | 2/1986 | Sciaky et al. |
| 4,857,697 A * | 8/1989 | Melville ............ B23K 26/0613 |
| | | 219/121.63 |

(Continued)

FOREIGN PATENT DOCUMENTS

| CN | 103492117 A | 1/2014 |
| JP | H08206838 A | 8/1996 |

(Continued)

OTHER PUBLICATIONS

Wu, A.P., et al., "Microstructures and mechanical properties of Ti—24Al—17Nb (at.%) laser beam welding joints," Intermetallics, 2002, pp. 647-652, vol. 10.

(Continued)

*Primary Examiner* — Thien S Tran
(74) *Attorney, Agent, or Firm* — Oliff PLC

(57) ABSTRACT

A laser welding method includes: forming a melted section in which plural metallic workpieces within a weld region are melted by projecting a first laser beam onto said weld region with parts of the workpieces being set as the weld region when the workpieces are welded; and projecting a second laser beam while the melted section is being solidified or after a solidified section in which the melted section is solidified is formed such that the second laser beam circles around center of the melted section or the solidified section from an irradiation start position deviated from said center toward said center or such that the second laser beam is focused to the center of the melted section or the solidified section from an irradiation start region that includes the center and a periphery thereof.

4 Claims, 14 Drawing Sheets

(51) Int. Cl.
   *B23K 26/32*     (2014.01)
   *B23K 26/082*    (2014.01)
   *B23K 26/244*    (2014.01)
   *B23K 101/18*    (2006.01)
   *B23K 103/04*    (2006.01)
   *B23K 103/10*    (2006.01)

(52) U.S. Cl.
   CPC ............ *B23K 26/244* (2015.10); *B23K 26/32* (2013.01); *B23K 2101/18* (2018.08); *B23K 2103/04* (2018.08); *B23K 2103/10* (2018.08); *Y10T 403/479* (2015.01)

(58) Field of Classification Search
   USPC ..................... 219/121.63, 121.64, 121.74
   See application file for complete search history.

(56) References Cited

U.S. PATENT DOCUMENTS

| | | |
|---|---|---|
| 2005/0028897 A1 | 2/2005 | Kurz et al. |
| 2009/0266801 A1 | 10/2009 | Oku et al. |
| 2012/0211474 A1* | 8/2012 | Hayashimoto ......... B23K 26/28 |
| | | 219/121.64 |

FOREIGN PATENT DOCUMENTS

| | | |
|---|---|---|
| JP | H10-76363 A | 3/1998 |
| JP | H10216973 A | 8/1998 |
| JP | 03080596 B2 | 8/2000 |
| JP | 2009262186 A | 11/2009 |
| JP | 2011062703 A | 3/2011 |
| JP | 2011-173146 A | 9/2011 |
| JP | 2012115876 A | 6/2012 |
| WO | 2012/146965 A1 | 11/2012 |

OTHER PUBLICATIONS

Jan. 18, 2018 Office Action issued in U.S. Appl. No. 14/680,455.

* cited by examiner

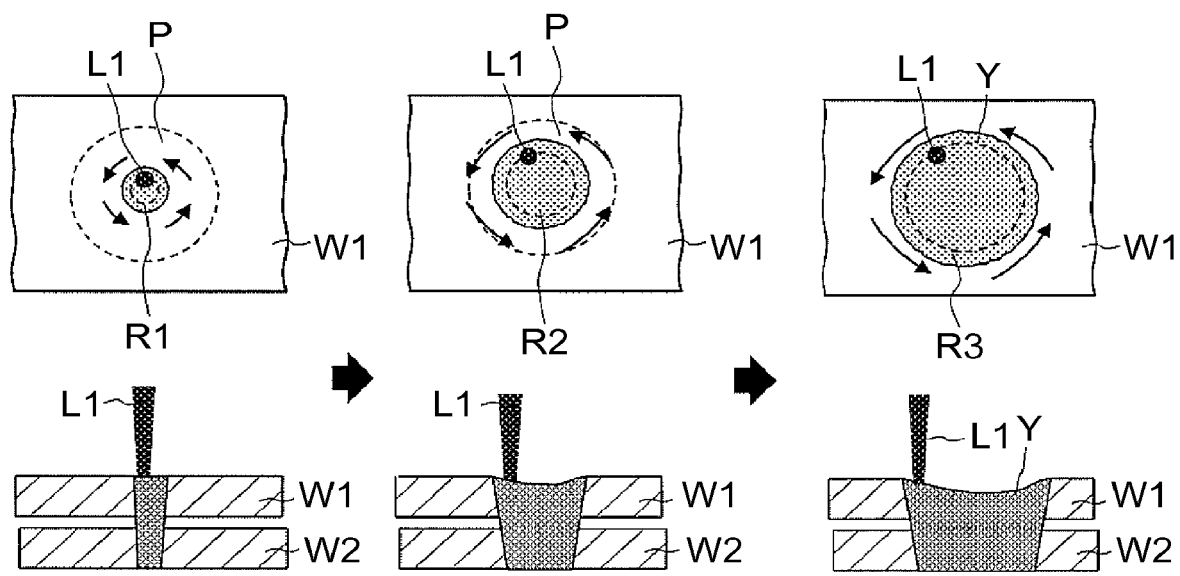

FIG. 3A
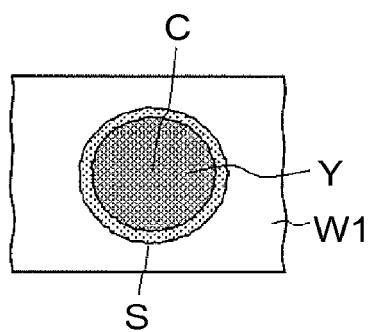
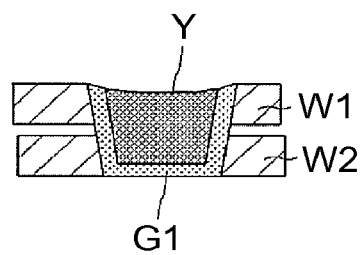
FIG. 3B
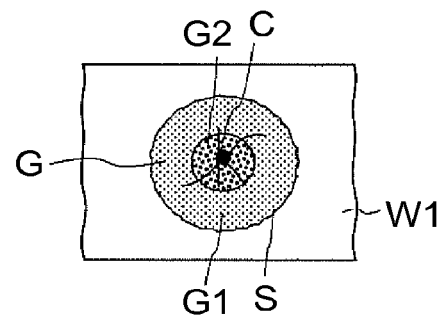
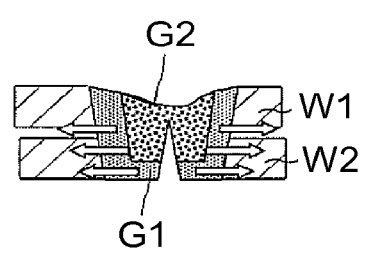

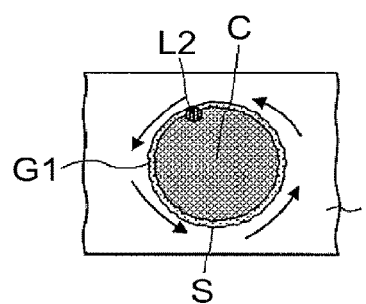
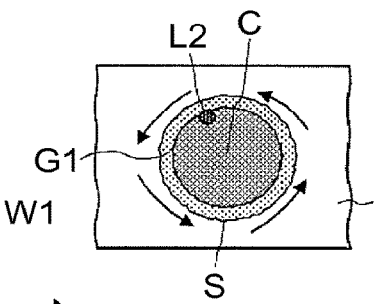
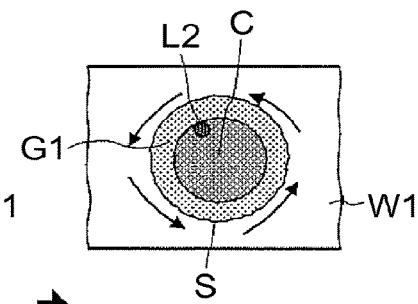
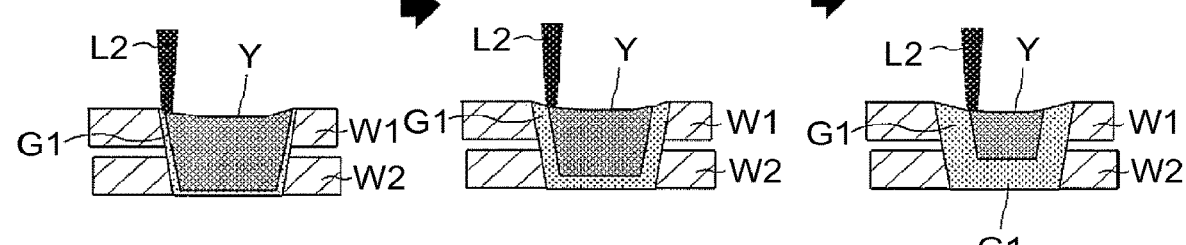
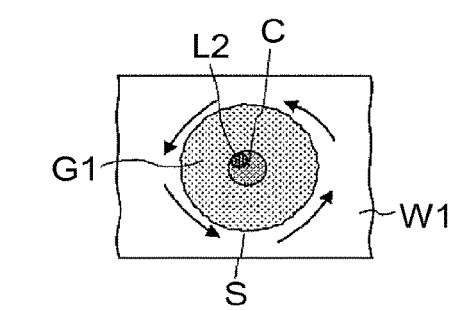
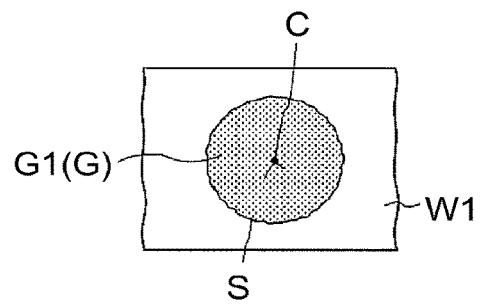
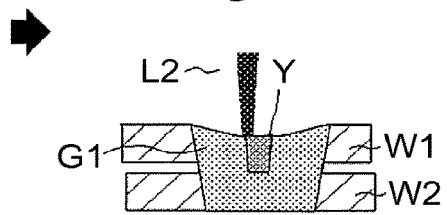
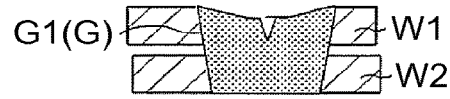

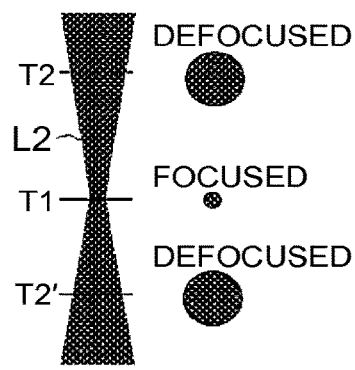
FIG. 5A
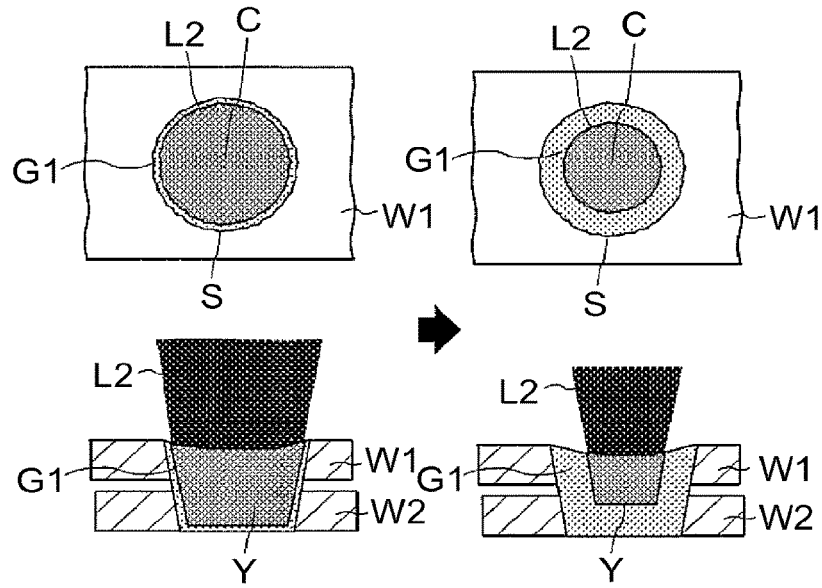
FIG. 5B
FIG. 5C
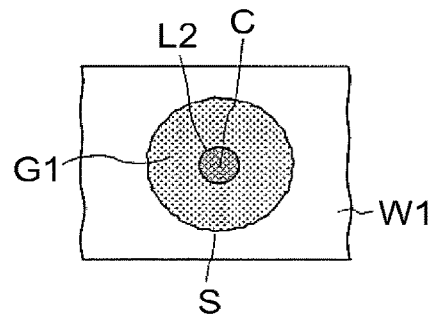
FIG. 5D
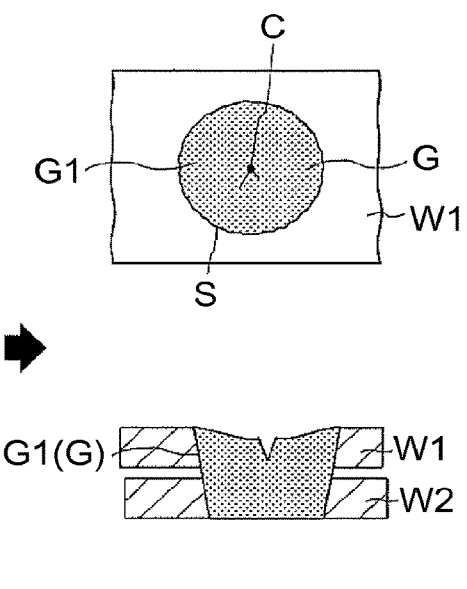
FIG. 5E

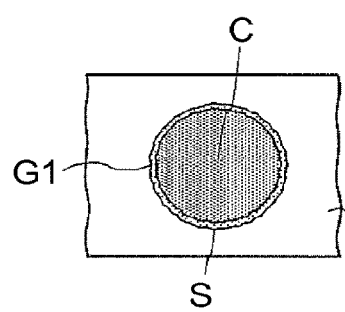
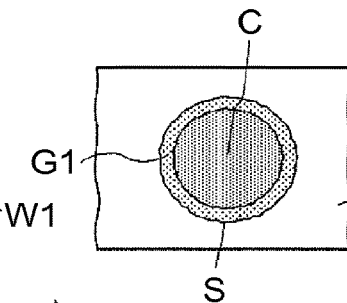
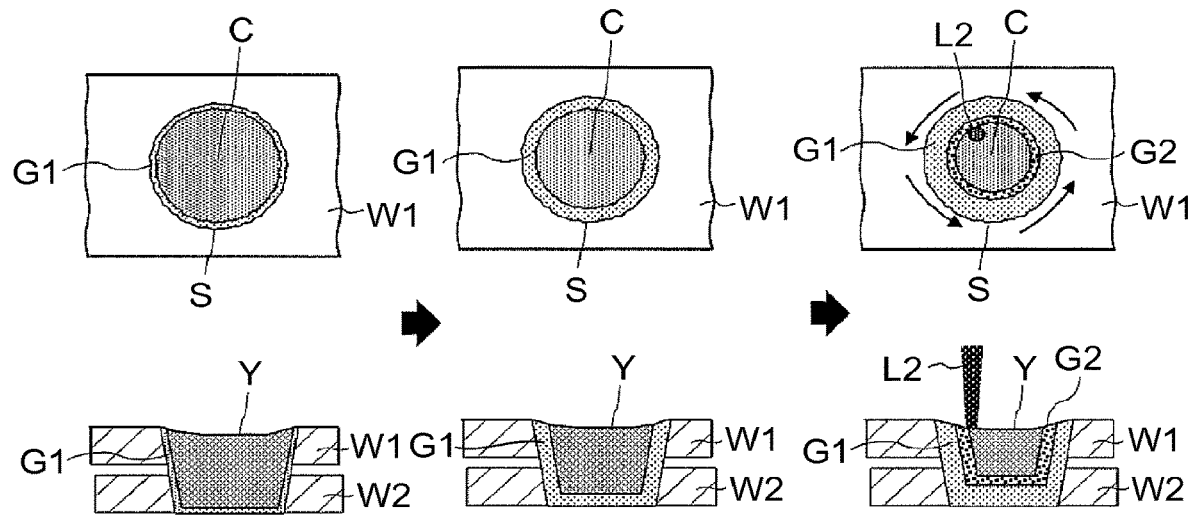
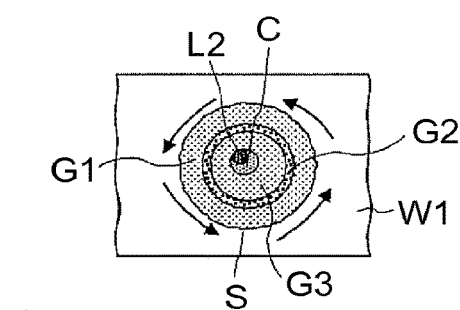
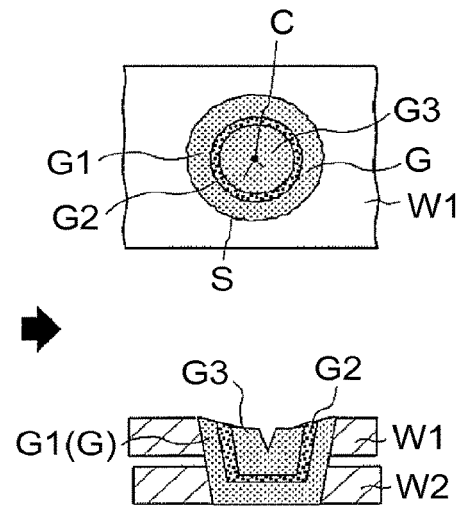

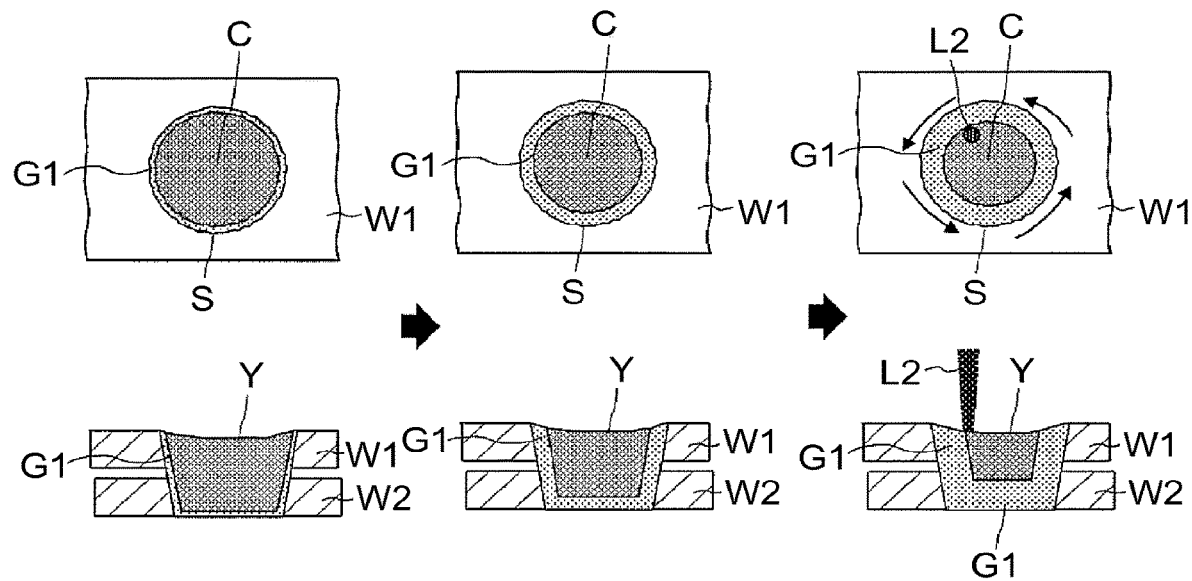

FIG. 14A
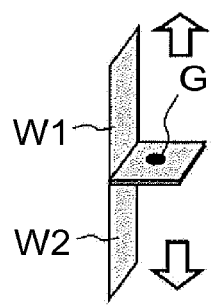
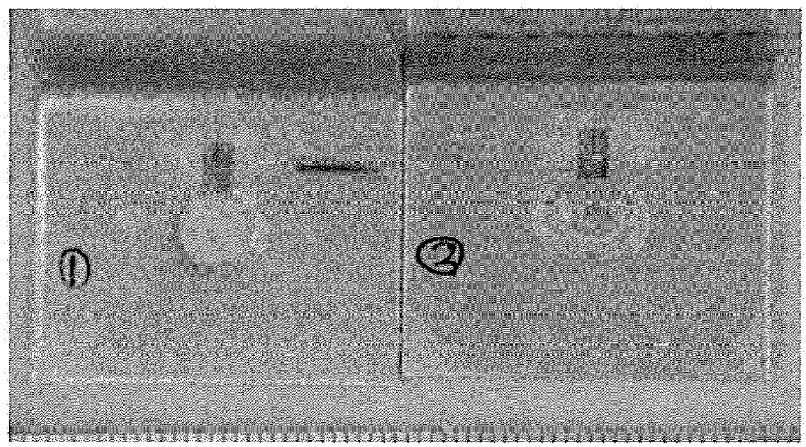
FIG. 14B
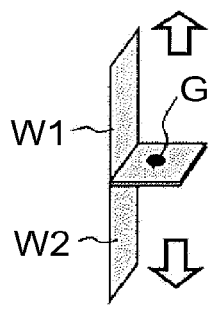
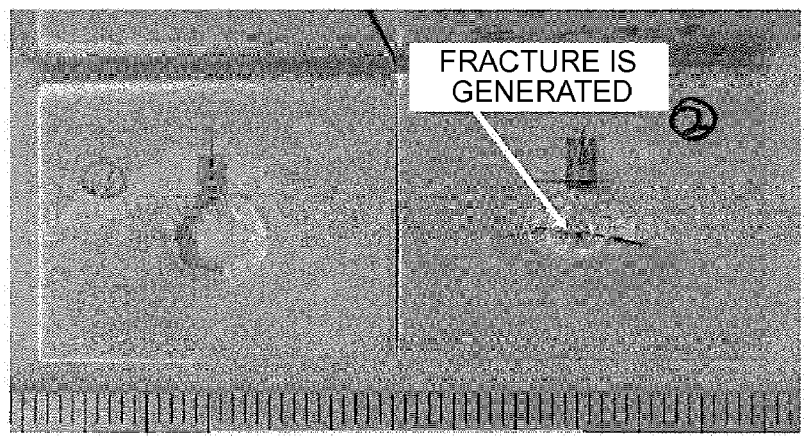

LASER WELD METHOD AND WELD STRUCTURE

INCORPORATION BY REFERENCE

This is a Division of application Ser. No. 14/680,455 filed Apr. 7, 2015, which in turn claims the benefit of Japanese Patent Application No. 2014-079702 filed on Apr. 8, 2014. The disclosure of the prior applications, including the specification, drawings and abstract, is hereby incorporated by reference herein in its entirety.

BACKGROUND OF THE INVENTION

1. Field of the Invention

The invention relates to a laser welding method that is favorable for welding plural workpieces with use of a laser beam and a weld structure.

2. Description of Related Art

For example, workpieces of two metal plates are stacked or abutted and irradiated with a laser beam for laser welding. In order to increase reliability and intensity by the laser welding, for example, in Japanese Patent Publication No. 3-80596, a technique of a laser welding method for projecting a laser beam onto a weld region with parts of surfaces of plural metallic workpieces being set as the weld region when the workpieces are welded is suggested.

In this technique, the laser beam is projected (scanned) to circle around center of the weld region. In this way, the workpieces can be melted together by being applied with a uniform amount of heat to a wide range. As a result, reliability of a weld section welded by the laser beam can be increased.

However, in the case where parts of the workpieces are melted by projecting the laser beam as described in Japanese Patent Publication No. 3-80596, heat is more likely to be dissipated from a periphery of a melted section (a molten pool) that has been melted rather than the center of the melted section, and thus solidification of the melted section starts from the periphery of the melted section and progresses toward the center of the melted section. At this time, a solidification rate from start of solidification of the center of the melted section to completion of solidification (that is, a cooling rate) is higher than a solidification rate (a cooling rate) of the periphery of the melted section.

As a result, there is a case where solidification shrinkage of the center of the weld section is completed before being compensated by liquid-phase flow and where this causes generation and extension of a crack that starts from the center of the weld section (a solidified section), in which the melted section is solidified, or the vicinity thereof. This crack extends from the center of the weld section (the solidified section), and thus a breaking mode thereof is difficult to be predicted. Especially when the workpieces made of aluminum alloy are used, such a phenomenon is significant.

SUMMARY OF THE INVENTION

The invention provides a laser welding method and a weld structure that can reduce a crack in a solidified section in which a melted section is solidified.

A first aspect of the invention relates to a laser welding method. The laser welding method includes: forming a melted section in which plural metallic workpieces within a weld region are melted by projecting a first laser beam onto said weld region with parts of surfaces of the workpieces being set as the weld region when the workpieces are welded; and projecting a second laser beam while the melted section is being solidified or after a solidified section in which the melted section is solidified is formed such that the second laser beam circles around center of the melted section or the solidified section from an irradiation start position deviated from said center toward said center or such that the second laser beam is focused to the center of the melted section or the solidified section from an irradiation start region that includes the center and a periphery thereof.

According to the above aspect, in irradiation of the first laser beam, the first laser beam is projected onto the weld region, so as to form the melted section (a molten pool) in which the workpieces in the weld region are melted. In irradiation of the second laser beam, in the case where the second laser beam is projected until the melted section is solidified, when the second laser beam circles around the center of the melted section from the irradiation start position that is deviated from the center toward the center, solidification of the center of the melted section can be delayed. Similarly, also when the second laser beam is focused to the center from the irradiation start region that includes the center of the melted section and the periphery thereof, the solidification of the center of the melted section can be delayed. Accordingly, the liquid flows along with solidification shrinkage of the center of the melted section, and thus generation of a crack in the vicinity of the center of the melted section can be suppressed.

Meanwhile, in the irradiation of the second laser beam, in the case where the second laser beam circles around the center from the irradiation start position that is deviated from the center of the solidified section toward the center after the solidified section in which the melted section is solidified is formed, an irradiated part is melted again, and thus the crack that is formed from the center of the solidified section toward a peripheral edge of the solidified section can be sealed. Similarly, also when the second laser beam is focused to the center from the irradiation start region that includes the center of the solidified section and the periphery thereof, the crack that is formed from the center of the solidified section toward the peripheral edge of the solidified section can be sealed.

Here, the "center of the melted section" in the invention refers to a part of the melted section that is solidified at the end while solidification of the melted section is started from a periphery thereof. The "center of the solidified section" refers to a part of the melted section before the solidification that is solidified at the end while the solidification thereof is started from the periphery thereof.

When the second laser beam is projected until the melted section is solidified, the second laser beam is projected onto a melted part of the melted section. Meanwhile, when the second laser beam is projected after the solidified section in which the melted section is solidified is formed, the second laser beam is projected onto a solidified section. It is because the melted section is completely solidified.

Here, in the above aspect, the second laser beam may be projected until the melted section is solidified. In the irradiation of the second laser beam, the second laser beam is projected onto the melted section along with the progression of the solidification in a direction from the peripheral edge of the melted section toward the center of the melted section. In this way, the progression of the solidification in the direction from the peripheral edge of the melted section toward the center of the melted section may be delayed.

According to the above aspect, with respect to progressing the solidification of the melted section from the peripheral edge thereof toward the center after the irradiation of the first laser beam, the melted section is irradiated with the second laser beam. Accordingly, the melted section is heated by the second laser beam, and the progression of the solidification in the direction from the peripheral edge of the melted section toward the center of the melted section can be delayed. In this way, liquid flows along with solidification shrinkage of the melted section, and thus generation of the crack in the vicinity of the center of the melted section can be suppressed.

Here, in the above aspect, in the irradiation of the second laser beam, the irradiation start position may be located on the peripheral edge of the melted section. In this case, in addition to the above-described effect, a fluctuation in a solidification rate (a cooling rate) can be suppressed from the peripheral edge of the melted section to the center of the melted section, and thus the melted section can be solidified to have a further uniform structure. Similarly, the irradiation start region may be a region that is surrounded by the peripheral edge of the melted section. Also, in this case, the melted section can be solidified to have a further uniform structure from the peripheral edge of the melted section to the center of the melted section.

Furthermore, in the above aspect, in the irradiation of the second laser beam, the irradiation start position may be located between the peripheral edge of the melted section and the center of the melted section. In this case, the progression of the solidification of at least the center of the melted section and the periphery thereof can be delayed. Accordingly, in addition to the above-described effect, the solidification rate (the cooling rate) at the center and the periphery thereof can be brought closer to the solidification rate (the cooling rate) in the vicinity of the peripheral edge of the melted section. Similarly, the irradiation start region may be a region, the peripheral edge of which is located between the peripheral edge of the melted section and the center of the melted section and which includes the center. The melted section can be solidified so as to have the uniform structure from the peripheral edge of the melted section to the center of the melted section.

In the above aspect, in the irradiation of the second laser beam, the second laser beam may be projected such that the columnar crystal structure grows from the peripheral edge of the melted section to the center of the melted section in conjunction with the progression of the solidification. In the case of any aspect, the solidification rate at any parts that are located from the peripheral edge of the melted section to the center of the melted section can be brought closer to each other. Thus, the solidified section in which the melted section is solidified (the weld section) is formed of the columnar crystal structure from the peripheral edge of the solidified section to the center of the solidified section, and in the columnar crystal structure, the columnar crystal extends in a direction from the peripheral edge of the solidified section toward the center of the solidified section. As a result, in the columnar crystal structure of the solidified section, even when the crack that starts from the center is generated, extension of the crack can be reduced. It is because growth of each of the columnar crystals from the peripheral edge of the solidified section to the center of the solidified section is intermittent.

In the above aspect, in a period after the irradiation of the first laser beam and before the irradiation of the second laser beam, a second laser beam irradiation may be started after the columnar crystal structure grows from the peripheral edge of the melted section toward the center of the melted section so as to surround the center of the melted section in conjunction with the progression of the solidification and then the growth of the equiaxed crystal structure is started after the growth of said columnar crystal structure is completed. In said second laser beam irradiation process, the second laser beam may be projected such that the equiaxed crystal structure remains in a manner to surround the center of the melted section and that the columnar crystal structure grows from said equiaxed crystal structure to the center of the melted section.

According to the above aspect, the solidified section in which the melted section is solidified (the weld section) includes: a first columnar crystal region that is formed of the columnar crystal structure in which the columnar crystal extends from the peripheral edge of the solidified section in the direction from the peripheral edge of the solidified section toward the center of the solidified section; an equiaxed crystal region that is formed of the equiaxed crystal structure formed to surround the center of the solidified section from the first columnar crystal region; and a second columnar crystal region that is formed of the columnar crystal structure from the equiaxed crystal region to the center of the solidified section, and in the columnar crystal structure, the columnar crystal extends toward the center of the solidified section. In this way, even when the crack that starts from the center is generated in the columnar crystal structure of the second columnar crystal region during the solidification, the extension of the crack can be reduced. It is because the growth of the columnar crystal is intermittent. In addition, even when the crack further extends, this crack can be stopped by the equiaxed crystal structure of the equiaxed crystal region. As a result, the extension of the crack can be suppressed.

In addition, in the above-described aspect, the case where the second laser beam is projected until the melted section is solidified is described. Meanwhile, an aspect of the case where the second laser beam is projected after the solidified section in which the melted section is solidified is formed will be described below.

In the above aspect, in the irradiation of the second laser beam, the second laser beam is projected onto the solidified section in which the melted section is solidified so as to melt the solidified section again. In this case, a position on a peripheral edge of a region that includes the center of the solidified section and the vicinity thereof may be set as the irradiation start position such that the cooling rate, in which the region that includes the center of the solidified section and the vicinity thereof and that is melted again by the irradiation of the second laser beam is solidified, is slower than the cooling rate, in which the region that includes the center of the melted section and the vicinity thereof is solidified after the irradiation of the first laser beam. According to this aspect, the crack is likely to be generated at the center of the solidified section and the vicinity thereof. However, a region from the irradiation start position to the center of the solidified section is melted again, and thus the crack that is formed at the center of the solidified section and the vicinity thereof can be sealed.

A region that is surrounded by the center of the solidified section and the peripheral edge of the region in the vicinity thereof may be set as the irradiation start region, and the second laser beam may be projected thereon. In this case, the same effect can be expected because an irradiated part in the irradiation start region is melted again, and thus the crack that is formed from the center of the solidified section toward the peripheral edge of the solidified section can be sealed.

In the above aspect, the solidified section may include: the equiaxed crystal region that is formed with an equiaxed crystal structure in a manner to include the center of the solidified section; and the columnar crystal region that is formed with a columnar crystal structure in a manner to surround the equiaxed crystal region from the peripheral edge of the solidified section toward the equiaxed crystal region. The second laser beam may be projected such that the equiaxed crystal structure of the equiaxed crystal region becomes the columnar crystal structure.

According to the above aspect, with the irradiation of the second laser beam, the entire equiaxed crystal structure becomes the columnar crystal structure in a manner to include the center of the solidified section. Thus, the solidified section is formed of the columnar crystal structure from the peripheral edge of the solidified section to the center of the solidified section, and in the columnar crystal structure, the columnar crystal extends in the direction from the peripheral edge of the solidified section toward the center of the solidified section. As a result, in the columnar crystal structure of the solidified section, even when the crack that starts from the center is generated, the extension of the crack can be reduced. It is because the growth of each of the columnar crystals from the peripheral edge of the solidified section to the center of the solidified section is intermittent.

In addition, in the above aspect, the solidified section may include: the equiaxed crystal region that is formed with an equiaxed crystal structure in a manner to include the center of the solidified section; and the columnar crystal region that is formed with a columnar crystal structure in a manner to surround the equiaxed crystal region from the peripheral edge of the solidified section toward the equiaxed crystal region. The second laser beam may be projected onto the equiaxed crystal region such that a part of the equiaxed crystal structure of the equiaxed crystal region surrounds the center of the solidified section and that the remaining equiaxed crystal structure of the equiaxed crystal region becomes the columnar crystal structure.

According to the above aspect, the solidified section (the weld section) includes: the first columnar crystal region that is formed of the columnar crystal structure in which the columnar crystal extends from the peripheral edge of the solidified section in the direction from the peripheral edge of the solidified section toward the center of the solidified section; the equiaxed crystal region that is formed of the equiaxed crystal structure formed to surround the center of the solidified section from the first columnar crystal region; and the second columnar crystal region that is formed of the columnar crystal structure from the equiaxed crystal region to the center of the solidified section, and in the columnar crystal structure, the columnar crystal extends toward the center of the solidified section. In this way, even when the crack that starts from the center is generated in the columnar crystal structure of the second columnar crystal region during the solidification, the extension of the crack can be reduced. It is because the growth of the columnar crystal is intermittent. In addition, even when the crack further extends, this crack can be stopped by the equiaxed crystal structure of the equiaxed crystal region. As a result, the extension of the crack can be suppressed.

A second aspect of the invention relates to a weld structure. The weld structure includes a weld section in which parts of plural metallic workpieces are melted by a laser beam and welded. The weld section is formed of a columnar crystal structure from a peripheral edge of the weld section to center of the weld section, and in the columnar crystal structure, a columnar crystal extends in a direction from the peripheral edge of the weld section toward the center of the weld section.

According to the above aspect, the weld section is formed of the columnar crystal structure from the peripheral edge of the weld section to the center of the weld section, and in the columnar crystal structure, the columnar crystal extends in the direction from the peripheral edge of the weld section toward the center of the weld section. Thus, in the columnar crystal structure of the weld section, even when the crack that starts from the center is generated, the extension of the crack can be reduced. It is because growth of each of the columnar crystals from the peripheral edge of the weld section to center of the weld section is intermittent.

In addition, a third aspect of the invention relates to a weld structure. The weld structure includes a weld section in which parts of plural metallic workpieces are melted by a laser beam and welded. The weld section includes: a first columnar crystal region that is formed of a columnar crystal structure in which a columnar crystal extends from a peripheral edge of the weld section in a direction from the peripheral edge of the weld section toward a center of the weld section; an equiaxed crystal region that is formed of an equiaxed crystal structure formed to surround the center of the weld section from the first columnar crystal region; and a second columnar crystal region that is formed of the columnar crystal structure from said equiaxed crystal region to the center of the weld section, and in the columnar crystal structure, the columnar crystal extends toward the center of the weld section.

According to the above aspect, even when a crack that starts from the columnar crystal structure of the second columnar crystal region in which the crack is likely to be generated during weld is generated, extension of the crack can be reduced. It is because the growth of the columnar crystal is intermittent. In addition, even when the crack further extends, this crack can be stopped by the equiaxed crystal structure of the equiaxed crystal region. As a result, the extension of the crack can be suppressed.

Furthermore, a fourth aspect of the invention relates to a weld structure. The weld structure includes a weld section in which parts of plural metallic workpieces are melted by a laser beam and welded. A surface of the weld section on a side that is irradiated with the laser beam is formed of: a primary recessed surface that is recessed from a peripheral edge of the weld section toward a center of the weld section; and a secondary recessed surface that is further recessed from said primary recessed surface in the vicinity of the center of said weld section. A back surface of the weld section that corresponds to the secondary recessed surface is not recessed or is a shallower recessed surface than the secondary recessed surface.

In the weld structures according to the above aspects, such a surface shape may be formed in the case where the weld structure is welded by the weld method of the laser beam as described above. In a general weld method, a large recess is formed in the back surface on the opposite side from the surface irradiated with the laser beam. However, in the above aspects of the invention, the surface on the side that is irradiated with the laser beam is formed with: the primary recessed surface that is recessed from the peripheral edge of the weld section toward the center of the weld section; and the secondary recessed surface that is further recessed from the primary recessed surface in the vicinity of the center of the weld section. Accordingly, the secondary recessed surface can easily be repaired by a sealer or the like after the weld. In addition, the back surface of the weld section that corresponds to the secondary recessed surface is not recessed or is the shallower recessed surface than the secondary recessed surface. Thus, water or the like is less likely to be collected, and a chance of corrosion of the part can be reduced.

According to the above aspect of the invention, a crack that is generated in the weld section located in the parts of the workpieces, that is, in the solidified section in which the melted section is solidified can be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2A to FIG. 2C are schematic views for illustrating a first laser beam irradiation process according to the laser welding method of the first embodiment of the invention, in which FIG. 2A to FIG. 2C show that workpieces are irradiated with a first laser beam in this order;

FIG. 3A and FIG. 3B are schematic views of a state in which a melted section is cooled without performing a second laser beam irradiation process after the irradiation process shown in FIG. 2A to FIG. 2C, and FIG. 3A and FIG. 3B show that the melted section is cooled in this order;

FIG. 4A to FIG. 4E are schematic views for illustrating the second laser beam irradiation process according to the laser welding method of the first embodiment of the invention, in which FIG. 4A to FIG. 4D show that the workpieces are irradiated with a second laser beam in this order, and in which FIG. 4E is a view of the weld section after the irradiation of the second laser beam;

FIG. 5A to FIG. 5E are schematic views for illustrating the second laser beam irradiation process according to the laser welding method of a modification of the first embodiment of the invention, in which FIG. 5A illustrates the irradiation of the second laser beam, in which FIG. 5B to FIG. 5D show that the workpieces are irradiated with the second laser beam in this order, and in which FIG. 5E is a view of the weld section after the irradiation of the second laser beam;

FIG. 6A to FIG. 6E are schematic views for illustrating the second laser beam irradiation process according to the laser welding method of a second embodiment of the invention, in which FIG. 6A and FIG. 6B are views of a change in solidification of the melted section, in which FIG. 6C and FIG. 6D show that the workpieces are irradiated with the second laser beam in this order, and in which FIG. 6E is a view of the weld section after the irradiation of the second laser beam;

FIG. 7A to FIG. 7E are schematic views for illustrating the second laser beam irradiation process according to the laser welding method of a modification of the second embodiment of the invention, in which FIG. 7A and FIG. 7B are views of the change in the solidification of the melted section, in which FIG. 7C and FIG. 7D show that the workpieces are irradiated with the second laser beam in this order, and in which FIG. 7E is a view of the weld section after the irradiation of the second laser beam;

FIG. 8A to FIG. 8D are schematic views for illustrating the second laser beam irradiation process according to the laser welding method of a third embodiment of the invention, in which FIG. 8A is a view of the solidified section after the irradiation of the first laser beam, in which FIG. 8B and FIG. 8C show that the workpieces are irradiated with the second laser beam in this order, and in which FIG. 8D is a view of the solidified section after the irradiation of the second laser beam;

FIG. 9A to FIG. 9D are schematic views for illustrating the second laser beam irradiation process according to the laser welding method of a modification of the third embodiment of the invention, in which FIG. 9A is a view of the solidified section after the irradiation of the first laser beam, in which FIG. 9B and FIG. 9C show that the workpieces are irradiated with the second laser beam in this order, and in which FIG. 9D is a view of the solidified section after the irradiation of the second laser beam;

FIG. 14A is an image of the surface of the fracture in the weld section according to the second example of the invention when a tensile load acts on the weld section; and FIG. 14B is an image of the surface of the fracture in the weld section according to the comparative example when the tensile load acts on the weld section.

DETAILED DESCRIPTION OF EMBODIMENTS

A laser welding method according to some embodiments of the invention will be described below.

First Embodiment

Figure 1A:
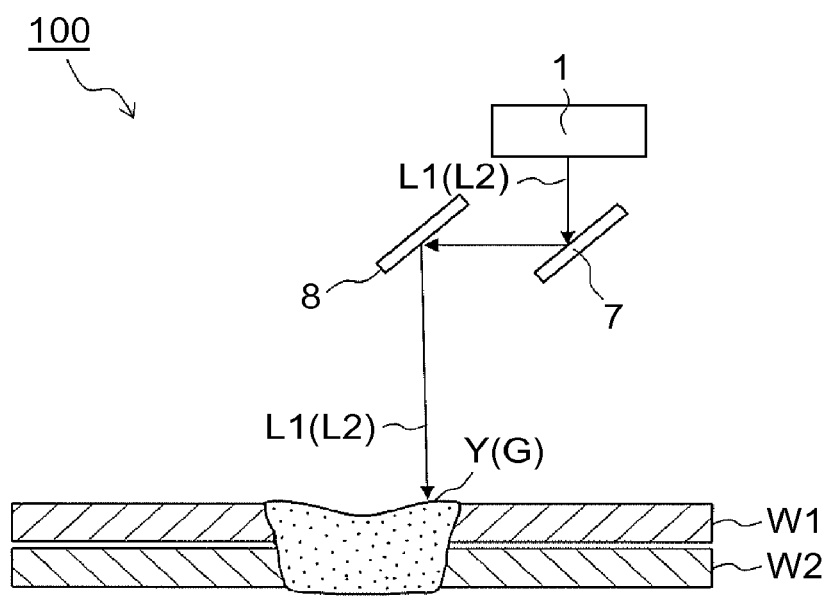
FIG. 1A is a schematic view of one example of a laser welding device for implementing a laser welding method according to a first embodiment of the invention and is a view of a weld state in a lateral direction.
Figure 1B:
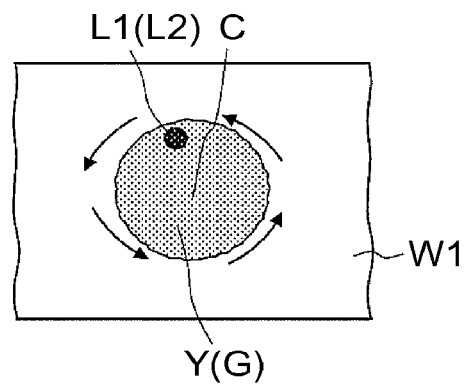
FIG. 1B is a schematic view of the one example of the laser welding device for implementing the laser welding method according to the first embodiment of the invention and is a view of the weld state in a front direction.

FIG. 1A and FIG. 1B are schematic views of one example of a laser welding device for implementing a laser welding method according to a first embodiment of the invention. FIG. 1A is a view of a weld state in a lateral direction, and FIG. 1B is a view of the weld state in a front direction.

1. Regarding a Device Configuration

FIG. 1A and FIG. 1B are schematic views of an overall configuration of a laser welding device 100 according to the embodiment of the invention. FIG. 1A is a view of the weld state in the lateral direction, and FIG. 1B is a view of the weld state in the front direction.

The laser welding device shown in FIG. 1A and FIG. 1B includes a laser beam irradiation section 1 as a main component. The laser beam irradiation section 1 is a device that provides laser beams for welding (first and second laser beams) L1, L2 and projects a selected laser beam onto two metallic workpieces W1, W2 that are stacked or arranged with a slight gap interposed therebetween. In this embodiment, the two workpieces W1, W2 are welded by being stacked. However, the number of the workpieces is not limited to two. For example, the two workpieces may be subject to butt welding or fillet welding in a method, which will be described below.

In addition, as a material of the workpieces W1, W2, a material that can easily be cracked, such as aluminum alloy or steel (high-carbon steel, for example), is preferred. A columnar crystal structure and an equiaxed crystal structure are likely to be formed in any of these materials by welding, which will be described below, and a crack is easily generated at the center of a weld section. However, such a problem can be solved by performing laser welding, which will be described below.

The first and second laser beams L1, L2, which will be described below, are each sequentially reflected by a fixed mirror 7 and a driven mirror 8 as optical systems and projected with respect to the two workpieces W1, W2. Here, the driven mirror 8 is controlled to be driven so that a direction of reflection of the first laser beam L1 incident on the driven mirror 8 is controlled and that the first and second laser beams L1, L2 are projected onto a desired position. These beams can be scanned in a trajectory (for example, in a circular shape or a helical shape) that is set in advance as shown in FIG. 1B, for example. First and second laser beam irradiation processes, which will be described below, are performed by using such a laser welding device 100.

2. Regarding the First Laser Beam Irradiation Process

FIG. 2A to FIG. 2C are schematic views for illustrating the first laser beam irradiation process according to the laser welding method of the first embodiment, in which FIG. 2A to FIG. 2C show that the workpieces are irradiated with the first laser beam in this order.

As shown in FIG. 2A to FIG. 2C, in the first laser beam irradiation process, when the two metallic workpieces W1, W2 are welded, parts of the workpieces are set as a weld region P, and the weld region P is irradiated with the first laser beam L1. In this way, a melted section Y in which the workpieces in the weld region P are melted is formed.

More specifically, in this embodiment, as shown in FIG. 2A, the first laser beam L1 is scanned on a periphery R1 such that the first laser beam L1 circles around center of the weld region P, and melts the workpieces in the periphery R1 of the weld region P.

Next, as shown in FIG. 2B, the first laser beam L1 is scanned on a periphery R2, a radius of which is larger than that of the periphery R1, such that the first laser beam L1 circles around the center of the weld region P, and melts the workpieces in the vicinity of the periphery R2 of the weld region P.

Furthermore, as shown in FIG. 2C, the first laser beam L1 is scanned on a periphery R3, a radius of which is larger than that of the periphery R2, such that the first laser beam L1 circles around the center of the weld region P, and melts the workpieces in the vicinity of the periphery R3 of the weld region P. Just as described, the first laser beam L1 circles around the center from the center of the weld region P toward a peripheral edge of the weld region P, and the material in the region is melted by the first laser beam L1.

In this way, in the melted section Y that is formed, a temperature at the peripheral edge is higher than a temperature at the center. Thus, compared to a case where the first laser beam L1 is scanned from the peripheral edge to the center, a solidification rate at the center can be lowered. Just as described, the center is gradually solidified in the same manner as the peripheral edge. Thus, it is possible to suppress a crack from generating in the vicinity of the center after the weld section is solidified.

Here, in the case where the second laser beam irradiation process, which will be described below, is not performed after the irradiation process shown in FIG. 2A to FIG. 2C and the melted section Y is cooled, as shown in FIG. 3A, heat is more easily radiated from a peripheral edge S of the melted section Y than from center C thereof. Accordingly, solidification starts from the peripheral edge S of the melted section Y, and the solidification of the melted section Y progresses toward the center.

Then, as shown in FIG. 3B, in a solidified section G in which the melted section Y is solidified, an equiaxed crystal structure G2 (an equiaxed crystal region) is formed in a manner to include the center C of the solidified section G, and a columnar crystal structure (a columnar crystal region) G1 is formed from the peripheral edge S of the solidified section G toward the equiaxed crystal region in a manner to surround the equiaxed crystal structure G2 (the equiaxed crystal region).

Here, irrespective of formation of the equiaxed crystal structure and the columnar crystal structure, a solidification rate (that is, a cooling rate) from the start of the solidification of the center C of the melted section Y to the complete solidification is higher than a solidification rate (a cooling rate) of the peripheral edge S of the melted section Y. As a result, solidification shrinkage of the center C of the melted section Y is completed before being compensated by liquid-phase flow at the center C, and the structure is pulled in a circumferential direction. This possibly causes generation and extension of the crack that starts from the center of the solidified section G or the vicinity thereof.

In view of the above, in this embodiment, the second laser beam irradiation process, which will be described below, is performed. Noted that, in this embodiment, the melted section (a molten pool) Y is formed by scanning the first laser beam L1. However, a method for forming the melted section and the like are not particularly limited as long as the melted section Y with the peripheral edge as shown in FIG. 2C can be formed.

3. Regarding the Second Laser Beam Irradiation Process

FIG. 4A to FIG. 4E are schematic views for illustrating the second laser beam irradiation process according to the laser welding method of the first embodiment, in which FIG. 4A to FIG. 4D show that the workpieces are irradiated with a second laser beam in this order and in which FIG. 4E is a view of the weld section after the irradiation of the second laser beam.

In this embodiment, in the second laser beam irradiation process, the second laser beam L2 is projected onto a melted part in the melted section Y until the melted section Y is solidified. More specifically, the second laser beam L2 circles around the center C from an irradiation start position that is deviated from the center C of the melted section Y toward the center C, and then the second laser beam L2 is focused to the center C.

More specifically, as shown in FIG. 4A, in this embodiment, the irradiation start position is located on the peripheral edge S of the melted section Y. The second laser beam L2 is projected onto the melted section Y from this position while circling around the center C such that the columnar crystal structure grows from the peripheral edge S of the melted section Y to the center of the melted section Y along with progression of the solidification in a direction from the peripheral edge S of the melted section Y toward the center C of the melted section Y. In this case, the second laser beam L2 may be projected to draw concentric circles with gradually reduced radii with the center C being the center. Alternatively, the second laser beam L2 may be projected in a helical shape toward the center C.

As described with reference to FIG. 3A, after the irradiation of the first laser beam, the solidification of the melted section Y is progressed from the peripheral edge S toward the center C. However, as described above, the progression of the solidification in the direction from the peripheral edge S of the melted section Y toward the center C of the melted section Y is delayed by projecting the second laser beam L2 onto the melted section Y.

In this way, a fluctuation in the solidification rate (the cooling rate) from the peripheral edge S of the melted section Y to the center C of the melted section Y is suppressed so that the melted section Y can be solidified to have the further uniform structure. In this embodiment, the solidified section G in which the melted section Y is solidified is formed of the columnar crystal structure from the peripheral edge S of the solidified section G to the center C of the solidified section G, and in the columnar crystal structure, a columnar crystal extends in a direction from the peripheral edge S of the solidified section G toward the center C of the solidified section G (for example, see FIG. 10A, which will be described below).

As a result, in the columnar crystal structure of the solidified section G, even when the crack that starts from the center C is generated, the extension of the crack can be reduced. It is because the growth of each of the columnar crystals from the peripheral edge S of the solidified section G to the center of the solidified section G is intermittent.

FIG. 5A to FIG. 5E are schematic views for illustrating the second laser beam irradiation process according to the laser welding method of a modification of the first embodiment, in which FIG. 5A illustrates the irradiation of the second laser beam, in which FIG. 5B to FIG. 5D show that the workpieces are irradiated with the second laser beam in this order, and in which FIG. 5E is a view of the weld section after the irradiation of the second laser beam.

In the above-described embodiment, the second laser beam L2 is scanned on the melted section Y. For example, as shown in FIG. 5A, a position of a focal point of the second laser beam L2 may be adjusted so as to adjust the irradiation region of the second laser beam L2 with respect to the workpieces. In this case, the irradiation region (an irradiation area) can be adjusted by moving a condenser lens of the second laser beam L2 at a high speed. Here, the second laser beam L2 is projected from a position T2 (T2') as a defocused position to a focused position of T1 while output of the laser beam is adjusted such that intensity thereof becomes constant, for example.

In this embodiment, the second laser beam L2 is projected such that the second laser beam L2 is focused from the irradiation start region, which includes the center C of the melted section Y and the periphery thereof, to the center C. More specifically, as shown in FIG. 5B, the irradiation start region is set as a region that is surrounded by the peripheral edge S of the melted section Y. Then, as shown in FIG. 5B to FIG. 5D, the progression of the solidification in the direction from the peripheral edge S of the melted section Y toward the center C of the melted section Y is delayed such that the columnar crystal structure grows from the peripheral edge S of the melted section Y to the center C of the melted section Y by focusing the second laser beam L2 to the melted section Y along with the progression of the solidification in the direction from the peripheral edge S of the melted section Y toward the center C of the melted section Y. As a result, the same effect as that obtained in the above-described case can be expected.

In this embodiment and the modification thereof, the second laser beam L2 is projected such that the columnar crystal structure grows from the peripheral edge S of the melted section Y to the center C of the melted section Y. However, for example, in the case where the progression of the solidification in the direction from the peripheral edge S of the melted section Y toward the center C of the melted section Y is delayed and where the liquid can flow along with the solidification shrinkage of the center C of the melted section Y, the extension of the crack at the center C can be suppressed. Thus, the irradiation of the second laser beam L2 along with the growth of the structure during the solidification is not necessarily required.

Second Embodiment

FIG. 6A to FIG. 6E are schematic views for illustrating the second laser beam irradiation process according to the laser welding method of a second embodiment, in which FIG. 6A and FIG. 6B are views of a change in the solidification of the melted section, in which FIG. 6C and FIG. 6D show that the workpieces are irradiated with the second laser beam in this order, and in which FIG. 6E is a view of the weld section after the irradiation of the second laser beam.

The second embodiment differs from the first embodiment in the irradiation start position of the second laser beam L2 and timing of the second laser beam L2. Noted that the second embodiment is the same as the first embodiment in a point that, in the second laser beam irradiation process, the melted part in the melted section Y is irradiated with the second laser beam L2 until the melted section Y is solidified. The same points of the second embodiment as the first embodiment will not be described in detail.

In the second embodiment, in the second laser beam irradiation process, the irradiation start position is located between the peripheral edge S of the melted section Y and the center C of the melted section Y (see FIG. 6C, for example). Here, in this embodiment, in a period after the first laser beam irradiation process (see FIG. 2C) and before the irradiation of the second laser beam (see FIG. 6C), as shown in FIG. 6A and FIG. 6B, the columnar crystal structure G1 grows from the peripheral edge S of the melted section Y toward the center C of the melted section Y in a manner to surround the center C of the melted section Y in conjunction with the progression of the solidification. At this time, the second laser beam is not projected.

Next, after the growth of the equiaxed crystal structure G2 is started after the growth of the columnar crystal structure G1 is completed, as shown in FIG. 6C, the second laser beam irradiation process is started. In the second laser beam irradiation process, the second laser beam L2 is projected such that the equiaxed crystal structure G2 remains to surround the center C of the melted section Y and that the columnar crystal structure grows from the equiaxed crystal structure G2 to the center C of the melted section Y. In this case, the second laser beam L2 may be projected to draw concentric circles with gradually reduced radii with the center C being the center. Alternatively, the second laser beam L2 may be projected in a helical shape toward the center C.

Figure 10A:
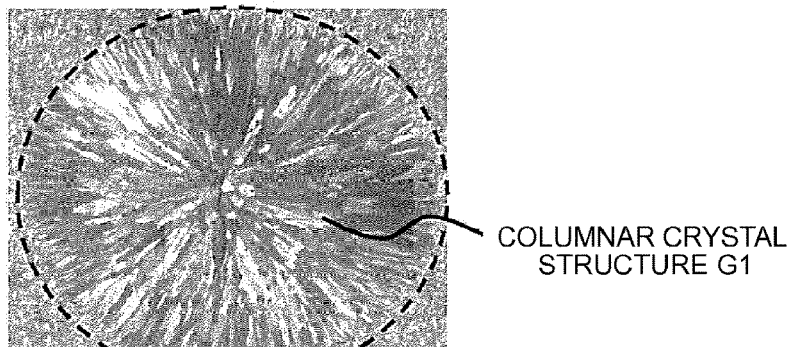
FIG. 10A is an image of a structure of a weld section according to a first example of the invention.
Figure 10B:
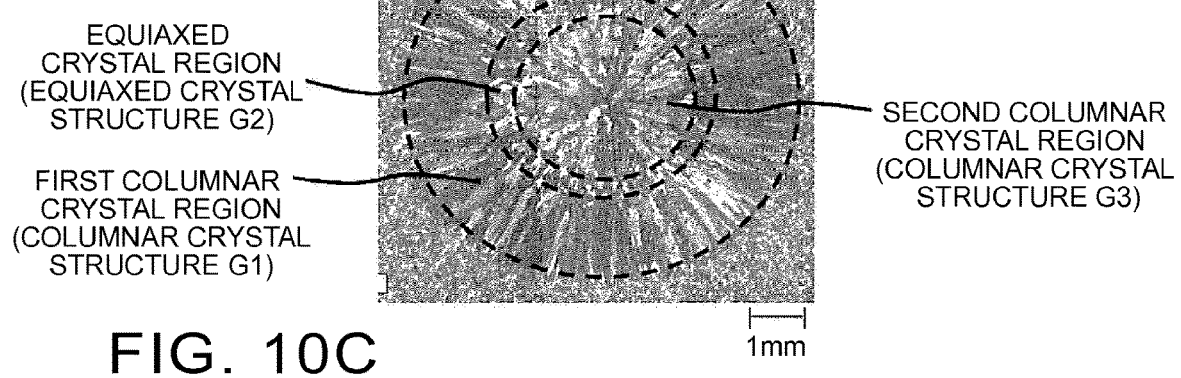
FIG. 10B is an image of the structure of the weld section according to a second example of the invention.

Just as described, as shown in FIG. 6E and FIG. 10B, which will be described below, in the solidified section (the weld section) G in which the melted section Y is solidified, a first columnar crystal region formed of the columnar crystal structure G1 is formed in the direction from the peripheral edge S of the solidified section G toward the center C of the solidified section G, and in the columnar crystal structure G1, the columnar crystal extends from the peripheral edge S of the solidified section G. Furthermore, the equiaxed crystal region formed of the equiaxed crystal structure G2 is formed to surround the center C of the solidified section G from the first columnar crystal region (the columnar crystal structure G1). Moreover, the second columnar crystal region formed of the columnar crystal structure G3 is formed from the equiaxed crystal region (the equiaxed crystal structure G2) to the center C of the solidified section G, and in the columnar crystal structure G3, the columnar crystal extends toward the center C of the solidified section G.

Accordingly, even when a crack that starts from the center C is generated in the columnar crystal structure of the second columnar crystal region (the columnar crystal structure G3) during the solidification, the extension of the crack can be reduced. It is because the growth of the columnar crystal is intermittent. In addition, even when the crack further extends, this crack can be stopped by the equiaxed crystal structure G2 of the equiaxed crystal region. As a result, the extension of the crack can be suppressed.

Here, the second laser beam may be used as described in the modification of the first embodiment. In this case, the irradiation start region needs to be a region, a peripheral edge of which is located between the peripheral edge S of the melted section Y and the center C of the melted section Y and which includes the center C.

FIG. 7A to FIG. 7E are schematic views for illustrating the second laser beam irradiation process according to the laser welding method of a modification of the second embodiment, in which FIG. 7A and FIG. 7B are views of the change in the solidification of the melted section, in which FIG. 7C and FIG. 7D show that the workpieces are irradiated with the second laser beam in this order, and in which FIG. 7E is a view of the weld section after the irradiation of the second laser beam.

In this modification, as shown in FIG. 7A to FIG. 7D, in the second laser beam irradiation process, the second laser beam L2 is projected in conjunction with the progression of the solidification immediately before the equiaxed crystal is formed or at the same time as the equiaxed crystal is formed such that the equiaxed crystal does not remain and that the columnar crystal structure G1 grows from the peripheral edge S of the melted section Y to the center C of the melted section Y. As a result, the same weld section (the solidified section G) as that in the first embodiment can be obtained.

The solidification rate of the peripheral edge S of the melted section Y can be brought closer to that of the center C of the melted section Y. Thus, as shown in FIG. 7E, the solidified section G in which the melted section Y is solidified is formed of the columnar crystal structure from the peripheral edge S of the solidified section G to the center of the solidified section G, and in the columnar crystal structure, the columnar crystal extends in the direction from the peripheral edge S of the solidified section G toward the center C of the solidified section G. As a result, in the columnar crystal structure of the solidified section G, even when the crack that starts from the center C is generated, the extension of the crack can be reduced. It is because the growth of each of the columnar crystals from the peripheral edge S of the solidified section G to the center of the solidified section G is intermittent.

Third Embodiment

Figure 8A:
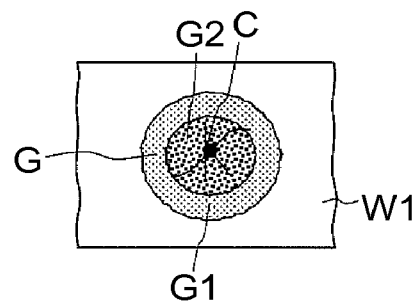
Figure 8B:
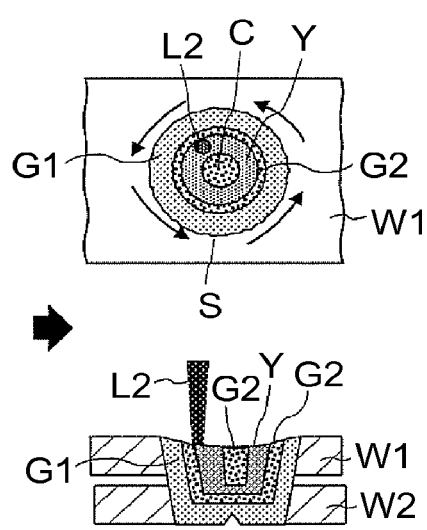
Figure 8C:
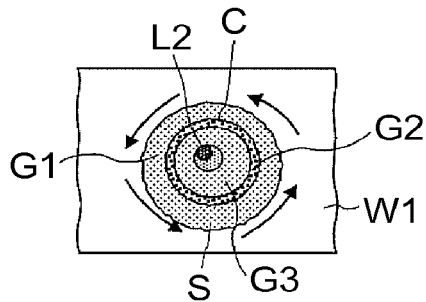
Figure 8D:
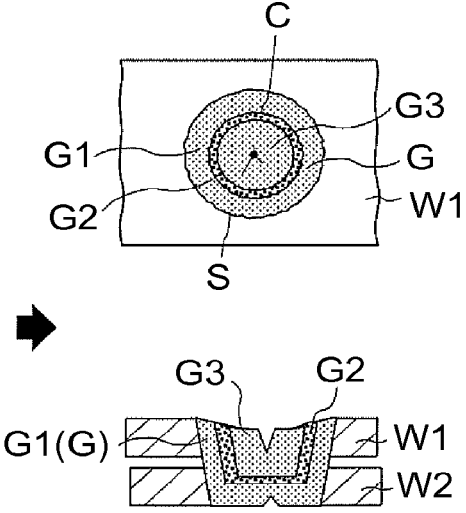

FIG. 8A to FIG. 8D are schematic views for illustrating the second laser beam irradiation process according to the laser welding method of a third embodiment, in which FIG. 8A is a view of the solidified section after the irradiation of the first laser beam, in which FIG. 8B and FIG. 8C show that the workpieces are irradiated with the second laser beam in this order, and in which FIG. 8D is a view of the solidified section after the irradiation of the second laser beam.

The third embodiment differs from the first and second embodiments in a point that the second laser beam is projected after the melted section is solidified. In this embodiment, after the solidified section G, in which the melted section Y is solidified, is formed (that is, see FIG. 3B and FIG. 8A), the second laser beam L2 is projected such that the second laser beam L2 circles around the center C from the irradiation start position that is deviated from the center C of the solidified section G toward the center C. In this way, the irradiated part is melted again, and thus a crack that is formed from the center C of the solidified section G toward the peripheral edge S of the solidified section G can be sealed.

More specifically, in the second laser beam irradiation process, the second laser beam L2 is projected onto the solidified section G and melts the solidified section G again. Here, a position on a peripheral edge of a region that includes the center C of the solidified section G and the vicinity thereof is set as the irradiation start positions such that the solidification rate until the region that includes the center of the solidified section and the vicinity thereof and that is melted again by the irradiation of the second laser beam L2 is solidified is lower than the solidification rate until the region that includes the center C of the melted section Y and the vicinity thereof is solidified after the irradiation of the first laser beam L1 (the cooling rate in the state shown in FIG. 3B). At this time, for the cooling rate, the intensity of the second laser beam is adjusted, heat absorbed by the solidified section G is also adjusted. In addition, similar to the first embodiment, the second laser beam L2 may be projected to draw the concentric circles with the gradually reduced radii with the center C being the center. Alternatively, the second laser beam L2 may be projected in the helical shape toward the center C.

In this embodiment, as described above, the solidified section G includes: the equiaxed crystal region that is formed with the equiaxed crystal structure G2 in the manner to include the center of the solidified section G; and the columnar crystal region that is formed of the columnar crystal structure G1 from the peripheral edge S of the solidified section G toward the equiaxed crystal region in a manner to surround the equiaxed crystal region. Thus, as shown in FIG. 8B, the second laser beam is projected onto the equiaxed crystal region and melts the equiaxed crystal region again (the melted section Y is formed) such that a part of the equiaxed crystal structure G2 of the equiaxed crystal region surrounds the center of the solidified section G and that the remaining equiaxed crystal structure in the equiaxed crystal region becomes the columnar crystal structure G3.

Just as described, similar to the second embodiment, in the solidified section (the weld section) G in which the melted section is solidified, the first columnar crystal region that is formed of the columnar crystal structure G1 is formed in the direction from the peripheral edge S of the solidified section G toward the center C of the solidified section G, and in the columnar crystal structure G1, the columnar crystal extends from the peripheral edge S of the solidified section G. Furthermore, the equiaxed crystal region formed of the equiaxed crystal structure G2 is formed to surround the center C of the solidified section G from the first columnar crystal region (the columnar crystal structure G1). Moreover, the second columnar crystal region formed of the columnar crystal structure G3 is formed from the equiaxed crystal region (the equiaxed crystal structure G2) to the center C of the solidified section G, and in the columnar crystal structure G3, the columnar crystal extends toward the center C of the solidified section G.

Accordingly, even when a crack that starts from the center C is generated in the columnar crystal structure of the second columnar crystal region (the columnar crystal structure G3) during the solidification, the extension of the crack can be reduced. It is because the growth of the columnar crystal is intermittent. In addition, even when the crack further extends, this crack can be stopped by the equiaxed crystal structure G2 of the equiaxed crystal region. As a result, the extension of the crack can be suppressed.

Similarly, also when a method for irradiating the laser beam as in the modification of the first embodiment is used to focus the second laser beam from the irradiation start region that includes the center C of the solidified section G and the periphery thereof (more specifically, the region on an inner side of the equiaxed crystal region) to the center C of the solidified section G, the crack that is formed from the center C of the solidified section G toward the peripheral edge S of the solidified section G can be sealed.

Figure 9A:
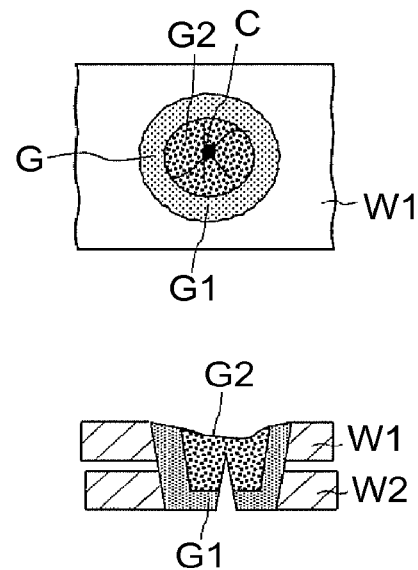
Figure 9B:
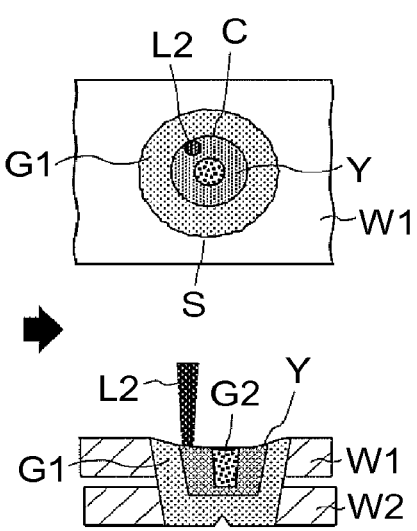
Figure 9C:
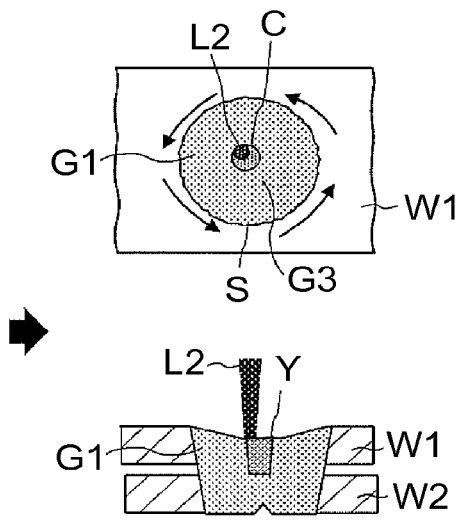
Figure 9D:
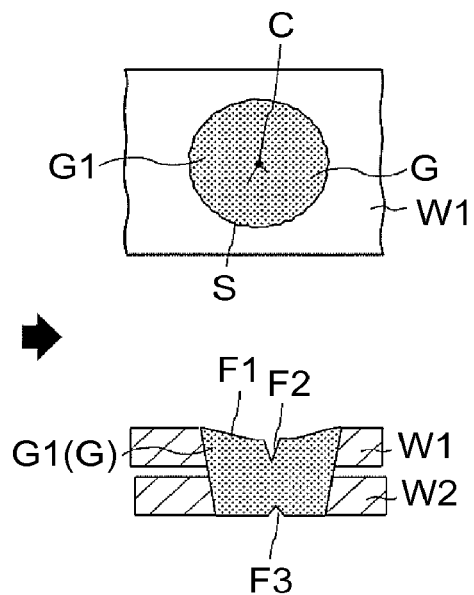

FIG. 9A to FIG. 9D are schematic views for illustrating the second laser beam irradiation process according to the laser welding method of a modification of the third embodiment, in which FIG. 9A is a view of the solidified section after the irradiation of the first laser beam, in which FIG. 9B and FIG. 9C show that the workpieces are irradiated with the second laser beam in this order, and in which FIG. 9D is a view of the solidified section after the irradiation of the second laser beam.

In the above-described embodiment, the second laser beam L2 is projected such that a part of the equiaxed crystal structure G2 remains. However, as shown in FIG. 9B and FIG. 9C, the second laser beam may be projected such that the equiaxed crystal structure G2 of the equiaxed crystal region becomes the columnar crystal structure G1.

In this way, in an obtained weld structure, the entire equiaxed crystal structure becomes the columnar crystal structure in a manner to include the center C of the solidified section (the weld section) G. Accordingly, the solidified section G is formed of the columnar crystal structure from the peripheral edge S of the solidified section G to the center of the solidified section G, and in the columnar crystal structure, the columnar crystal extends in the direction from the peripheral edge S of the solidified section G toward the center C of the solidified section G. As a result, in the columnar crystal structure G3 of the solidified section G, even when the crack that starts from the center C is generated, the extension of the crack can be reduced. It is because the growth of each of the columnar crystals from the peripheral edge S of the solidified section G to the center of the solidified section G is intermittent.

Noted that, in any of the embodiments, the laser beam is projected onto the melted section or the center of the solidified section for a long time in the weld structure that includes the weld section (the solidified section G) that is welded by the first and second laser beams. Accordingly, in any of the embodiments, as exemplified in FIG. 9C, for example, a surface of the solidified section G on a side that is irradiated with the laser beam is formed of a primary recessed surface F1 that is recessed from the peripheral edge S of the solidified section G toward the center of the weld section and a secondary recessed surface F2 that is further recessed from the primary recessed surface F1 in the vicinity of the center of the solidified section G. In addition, a back surface of the solidified section G that corresponds to the secondary recessed surface F2 is formed of a recessed surface F3 that is shallower than the secondary recessed surface F2. In addition, as shown in the other embodiments, the back surface of the solidified section G that corresponds to the secondary recessed surface F2 may not be recessed (see FIG. 7E, for example).

As a result, the secondary recessed surface F2 is formed on the surface on the side that is irradiated with the laser beam. Thus, the secondary recessed surface F2 can easily be repaired by a sealer or the like after welding. In addition, the back surface of the weld section that corresponds to the secondary recessed surface F2 is either not recessed or is formed of the recessed surface F3 that is shallower than the secondary recessed surface F2. Thus, water or the like is less likely to be collected therein, and a chance of corrosion of the part can be reduced.

EXAMPLES

Examples according to the invention will be described below.

First Example (Corresponding to FIG. 4A to FIG. 4E)

Plate materials (workpieces) that are made of 6000 series aluminum alloy and respectively have thicknesses of 1.2 mm and 1.0 mm were prepared. The first laser beam was projected thereon to have a weld radius of 8 mm. Furthermore, by using the method shown in the first embodiment (shown in FIG. 4A to FIG. 4E), a scanning trajectory of the second laser beam was gradually focused from the outer periphery of the melted section to the inner side, and the melted section was slowly cooled for solidification to form the weld section in each of these materials. The first laser beam had output of 2.5 to 4.0 kw, and the second laser beam had output in a range of 0.5 to 1.5 kw. Similarly, the plate materials as the workpieces were bent in an L shape and welded as shown in FIG. 14A and FIG. 14B.

Second Example (See FIG. 6A to FIG. 6E)

The plate materials as the workpieces were welded in the same manner as in the first example. The second example differed from the first example in a point that, in the method described in the second embodiment (see FIG. 6A to FIG. 6E), the irradiation of the laser beam remained stopped in a period after the projection of the first laser beam and before the solidification of the center of the melted section until the formation of the equiaxed crystal was started, then the laser beam was projected again after the formation of the equiaxed crystal, and the region on the inner side of the equiaxed crystal was slowly cooled to solidify the melted section (to form the weld section).

Comparative Example

The plate materials as the workpieces were welded in the same manner as in the first example. The comparative example differed from the first example in a point that the second laser beam was not projected.

<Observation of Structures>

The weld sections according to the first and second examples and the comparative example were subject to electropolishing and then observed with a microscope. FIG. 10A is an image of the structure of the weld section according to the first example, FIG. 10B is an image of the structure of the weld section according to the second example, and FIG. 10C is an image of the structure of the weld section according to the comparative example.

As shown in FIG. 10A, it can be understood that the weld section of the first example was formed of the columnar crystal structure from the peripheral edge of the weld section to the center of the weld section, and in the columnar crystal structure, the columnar crystal extended in the direction from the peripheral edge of the weld section toward the center of the weld section.

As shown in FIG. 10B, in the weld section of the second example, the first columnar crystal region that was formed of the columnar crystal structure was formed, and in the columnar crystal structure, the columnar crystal extended from the peripheral edge of the weld section in the direction from the peripheral edge of the weld section toward the center of the weld section. In addition, the equiaxed crystal region that was formed of the equiaxed crystal structure was formed from the first columnar crystal region, and the equiaxed crystal structure being formed to surround the center of the weld section. Furthermore, the second columnar crystal region that was formed of the columnar crystal structure was formed from the equiaxed crystal region to the center of the weld section, and in the columnar crystal structure, the columnar crystal extended toward the center of the weld section.

Figure 10C:
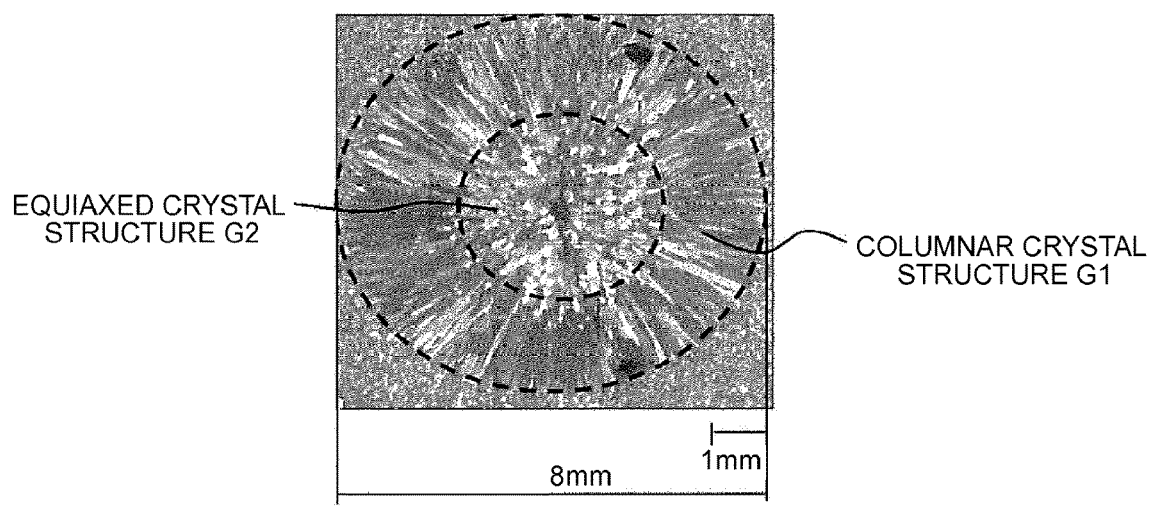
FIG. 10C is an image of the structure of the weld section according to a comparative example.

As shown in FIG. 10C, in the weld section of the comparative example, the equiaxed crystal structure was formed to include the center of the weld section, and the columnar crystal structure was formed from the peripheral edge of the weld section toward the equiaxed crystal region in a manner to surround the equiaxed crystal region.

<Observation of Cross Sections>

Figure 11A:
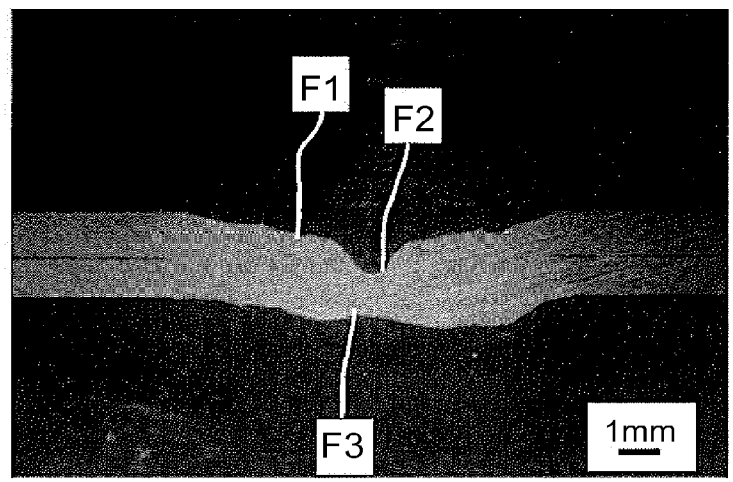
FIG. 11A is an image of a cross section of the weld section according to the first example of the invention.

The cross sections of the weld sections according to the first example and the comparative example were observed with the microscope. FIG. 11A is an image of a cross section of the weld section according to the first example, and FIG. 11B is an image of the cross section of the weld section according to the comparative example.

As shown in FIG. 11A, in the weld section of the first example, the surface of the weld section on the side that was irradiated with the laser beam was formed with the primary recessed surface F1 that was recessed from the peripheral edge of the weld section toward the center of the weld section and the secondary recessed surface F2 that was further recessed from the primary recessed surface F1 in the vicinity of the center of the weld section. In addition, the back surface of the solidified section G that corresponded to the secondary recessed surface F2 was formed with the recessed surface F3 that was shallower than the secondary recessed surface F2.

Figure 11B:
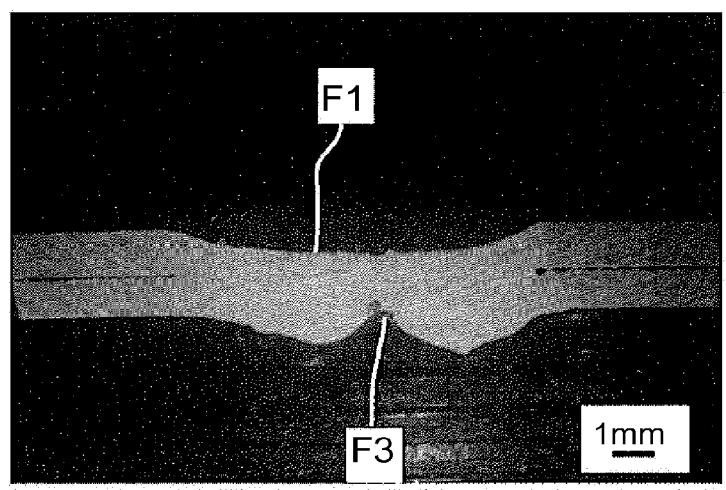
FIG. 11B is an image of the cross section of the weld section according to the comparative example.

As shown in FIG. 11B, in the weld section of the comparative example, the surface of the weld section on the side that is irradiated with the laser beam was formed with the primary recessed surface F1 that was recessed from the peripheral edge of the weld section toward the center of the weld section. However, the secondary recessed surface F2 that was further recessed from the primary recessed surface F1 in the vicinity of the center of the weld section as described in the first example was not formed. Differing from the back surface of the solidified section G in the first example, the back surface of the solidified section G that corresponded to the secondary recessed surface F2 was formed with the recessed surface F3 that was deeper than the secondary recessed surface F2.

<Observation of Fractures>

Figure 12A:
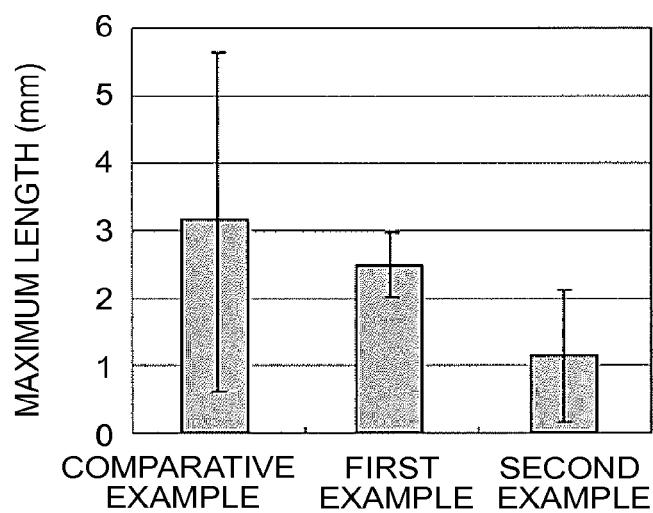
FIG. 12A is a graph of maximum lengths of fractures in the weld sections according to the first example, the second example, and the comparative example of the invention.

Three samples were used to measure maximum lengths of the fracture and total lengths of the fracture with respect to the weld sections according to the first and second examples and the comparative example. FIG. 12A shows the maximum lengths of the fracture in the weld sections according to the first example, the second example, and the comparative example, and FIG. 12B shows the total lengths of the fractures in the weld sections according to the first example, the second example, and the comparative example.

Figure 12B:
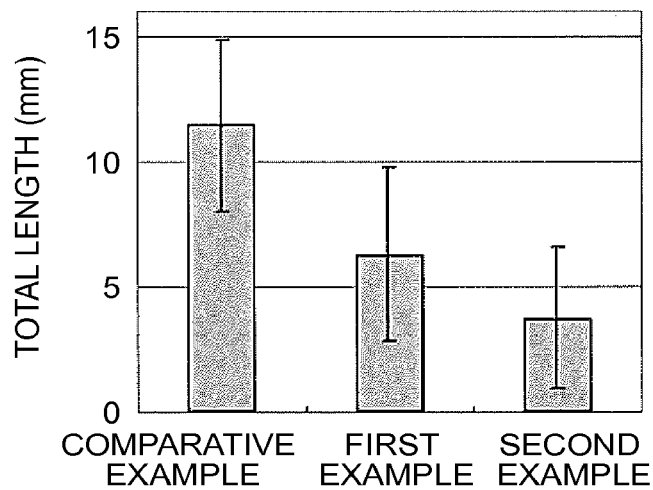
FIG. 12B is a graph of total lengths of the fractures in the weld sections according to the first example, the second example, and the comparative example of the invention.

As shown in FIG. 12A and FIG. 12B, the maximum length of the fracture and the total length of the fracture were short in an order of the second example, the first example, and the comparative example. It is considered that, in the case of the first example, in comparison with the comparative example, the columnar crystal structure was formed from the peripheral edge of the solidified section to the center of the solidified section, the growth of each of the columnar crystals in the columnar crystal structure was intermittent, and thus the extension of the crack could be reduced. It is also considered that, in the case of the second example, in comparison with the first example and the comparative example, even when the crack that started from the center was generated in the columnar crystal structure of the second columnar crystal region during the solidification, this crack could be stopped by the equiaxed crystal structure of the equiaxed crystal region.

<Observation of Fracture Morphology>

Figure 13A:
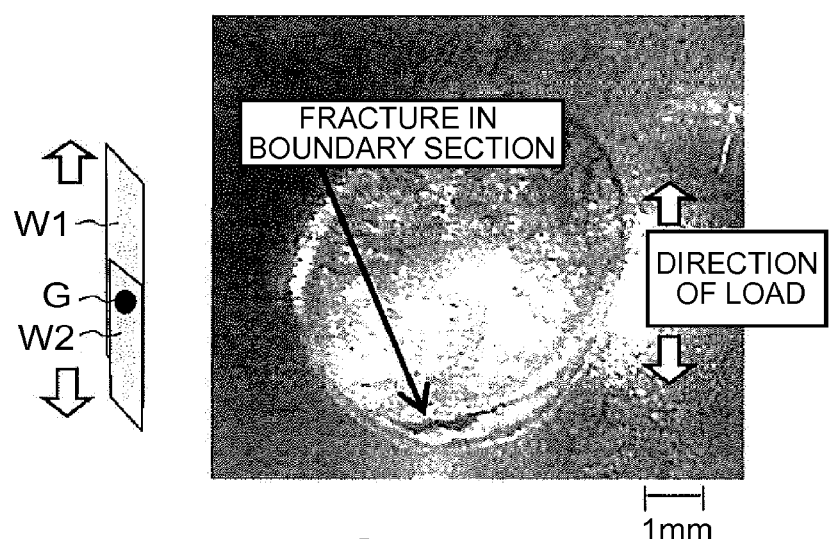
FIG. 13A is an image of a surface of the fracture in the weld section according to the second example of the invention when a shearing load acts on the weld section.

With respect to the first example and the comparative example, states of the surface at a time when a shearing load acted on the weld sections were observed. FIG. 13A is an image of the surface of the weld section according to the second example when a shearing load acted on the weld section, and FIG. 13B is an image of the surface of the fracture in the weld section according to the comparative example when the shearing load acted on the weld section.

For the first example and the comparative example, states of the surface at a time when a tensile load acted on the weld section were observed. FIG. 14A is an image of the surface of the weld section according to the second example when the tensile load acted on the weld section, and FIG. 14B is an image of the surface of the fracture in the weld section according to the comparative example when the tensile load acted on the weld section.

Figure 13B:
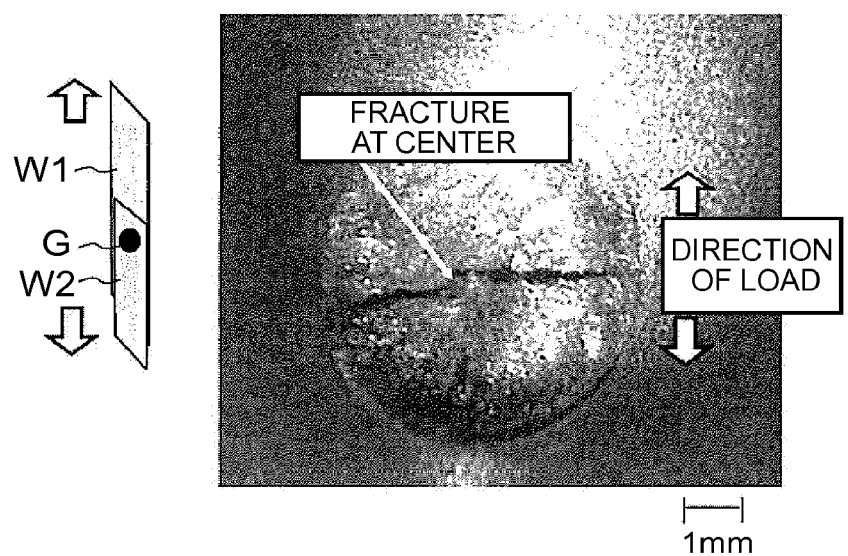
FIG. 13B is an image of the surface of the fracture in the weld section according to the comparative example when the shearing load acts on the weld section.

As shown in FIG. 13A and FIG. 13B, in the case of the second example, the fracture was generated at the peripheral edge of the weld section (a boundary section). However, in the case of the comparative example, the fracture was generated at the center of the weld section. In other words, in the second example, the fracture was not generated from the crack that was generated by welding.

As shown in FIG. 14B, in the case of the second example, the fracture was not generated. However, in the case of the comparative example, the fracture was generated at the center of the weld section.

The description has been made so far by using the embodiments of the invention. Specific configurations thereof are not limited to these embodiments and examples, and any design changes that are made within the scope of the gist of the invention are included in the invention.

What is claimed is:

1. A weld structure comprising:
a weld section in which parts of plural metallic workpieces have been melted by a laser beam and welded,
wherein the weld section is formed of a columnar crystal structure from a peripheral edge of the weld section to a center of the weld section, and in the columnar crystal structure, a columnar crystal has a column shape with a principal axis of extension in a direction from the peripheral edge of the weld section toward the center of the weld section.

2. A weld structure comprising:
a weld section in which parts of plural metallic workpieces have been melted by a laser beam and welded, wherein
the weld section is formed of a first columnar crystal region, an equiaxed crystal region, and a second columnar crystal region in a direction from a peripheral edge of the weld section toward a center of the weld section, the first columnar crystal region being formed of a columnar crystal structure in which a columnar crystal extends from the peripheral edge of the weld section, the equiaxed crystal region being formed from the first columnar crystal region and formed of an equiaxed crystal structure that is formed to surround the center of the weld section, and the second columnar crystal region being formed from said equiaxed crystal region to the center of the weld section and formed of the columnar crystal structure in which the columnar crystal extends toward the center of the weld section.

3. A weld structure comprising:
a weld section in which parts of plural metallic workpieces have been melted by a laser beam and welded, wherein:
a surface of the weld section on a side that has been irradiated with the laser beam is formed of a primary recessed surface that is recessed from a peripheral edge of the weld section toward a center of the weld section and a secondary recessed surface that is further recessed from said primary recessed surface in a vicinity of the center of said weld section, and
a back surface of the weld section that corresponds to the secondary recessed surface is not recessed or is a shallower recessed surface than the secondary recessed surface.

4. The weld structure according to claim 1, wherein the direction from the peripheral edge of the weld section toward the center of the weld section is orthogonal to a joining direction along which the plural metallic workpieces are joined to each other by welding.

* * * * *